United States Patent
Potter

[11] Patent Number: 6,126,051
[45] Date of Patent: Oct. 3, 2000

[54] VEHICLE ARTICLE CARRIER HAVING SIDE RAIL MOUNTING SUPPORT WITH CONCEALED SECURING MEMBER

[75] Inventor: Donald R. Potter, Clarkston, Mich.

[73] Assignee: JAC Products, Inc., Ann Arbor, Mich.

[21] Appl. No.: 09/328,330

[22] Filed: Jun. 9, 1999

[51] Int. Cl.[7] .............................. B60R 9/045; B60R 9/05; B60R 9/04

[52] U.S. Cl. ........................ 224/321; 224/316; 224/325; 224/309; 224/326

[58] Field of Search ..................................... 224/316, 321, 224/325, 326, 329, 330, 331, 322, 309, 328

[56] References Cited

U.S. PATENT DOCUMENTS

| | | |
|---|---|---|
| 3,451,602 | 6/1969 | Bott . |
| 4,174,794 | 11/1979 | Bott . |
| 4,448,336 | 5/1984 | Bott . |
| 4,673,119 | 6/1987 | Bott . |
| 4,944,439 | 7/1990 | Bott . |
| 5,556,016 | 9/1996 | Arvidsson ............................. 224/329 |

FOREIGN PATENT DOCUMENTS 4320762  1/1994  Germany ............................... 224/331

*Primary Examiner*—Stephen K. Cronin
*Assistant Examiner*—Tri M. Mai
*Attorney, Agent, or Firm*—Harness, Dickey & Pierce, PLC

[57] ABSTRACT

A vehicle article carrier having a pair of generally parallel disposed side rails and a plurality of mounting support members for securing the side rails fixedly to an outer body surface, wherein each outermost end of each side rail is secured to its associated mounting support member without any fastening element being visible at the areas where each outermost end of the side rail attaches to the mounting support members. A mounting plate is disposed in one tubular end of the side rail such that the ends of the mounting plate engage opposing slots formed in an outermost end of the side rail. A fastening element is inserted through an opening of an internal boss formed within the mounting support member and engages a threaded opening in the mounting plate. The fastener secures the mounting plate, and therefore the outermost end of the side rail, to the mounting support member without the fastening member or mounting plate being visible once these two components are secured together.

13 Claims, 5 Drawing Sheets

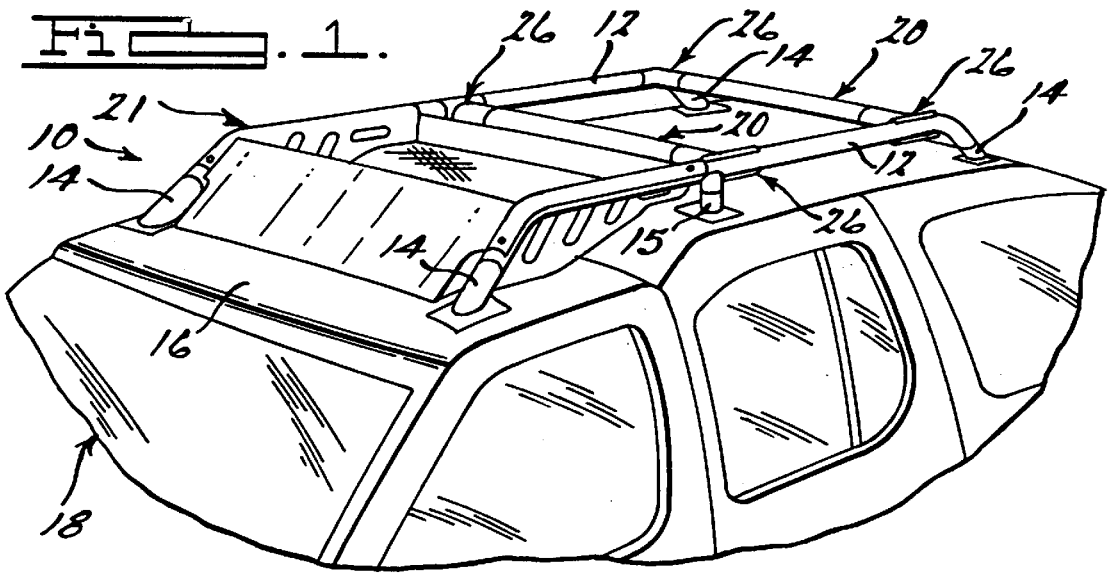
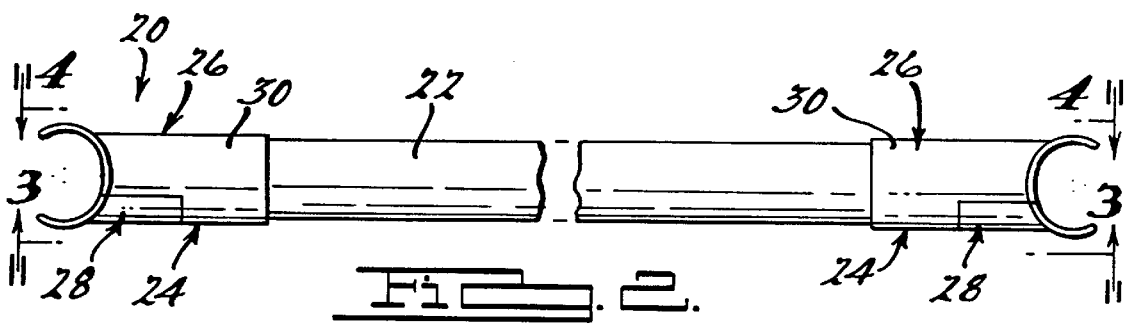
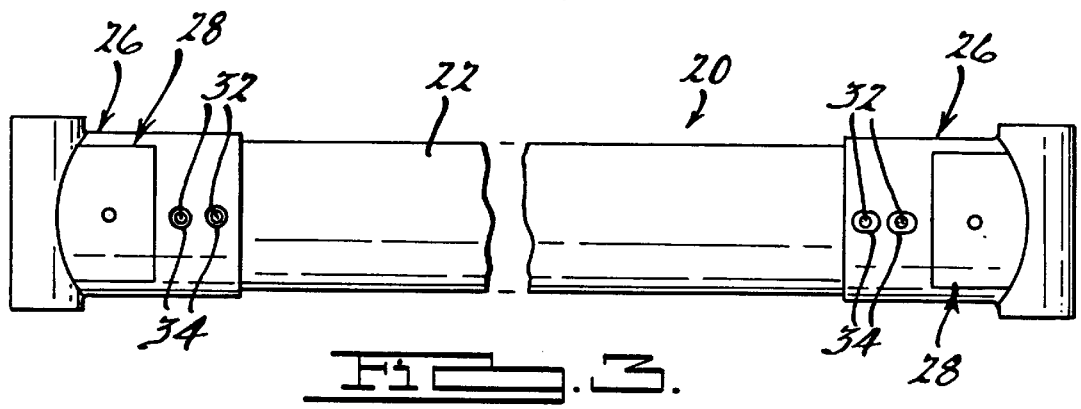
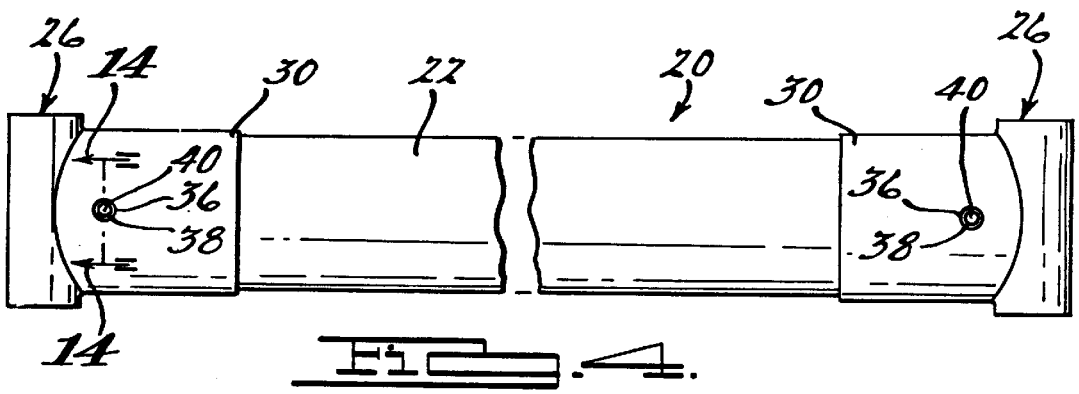

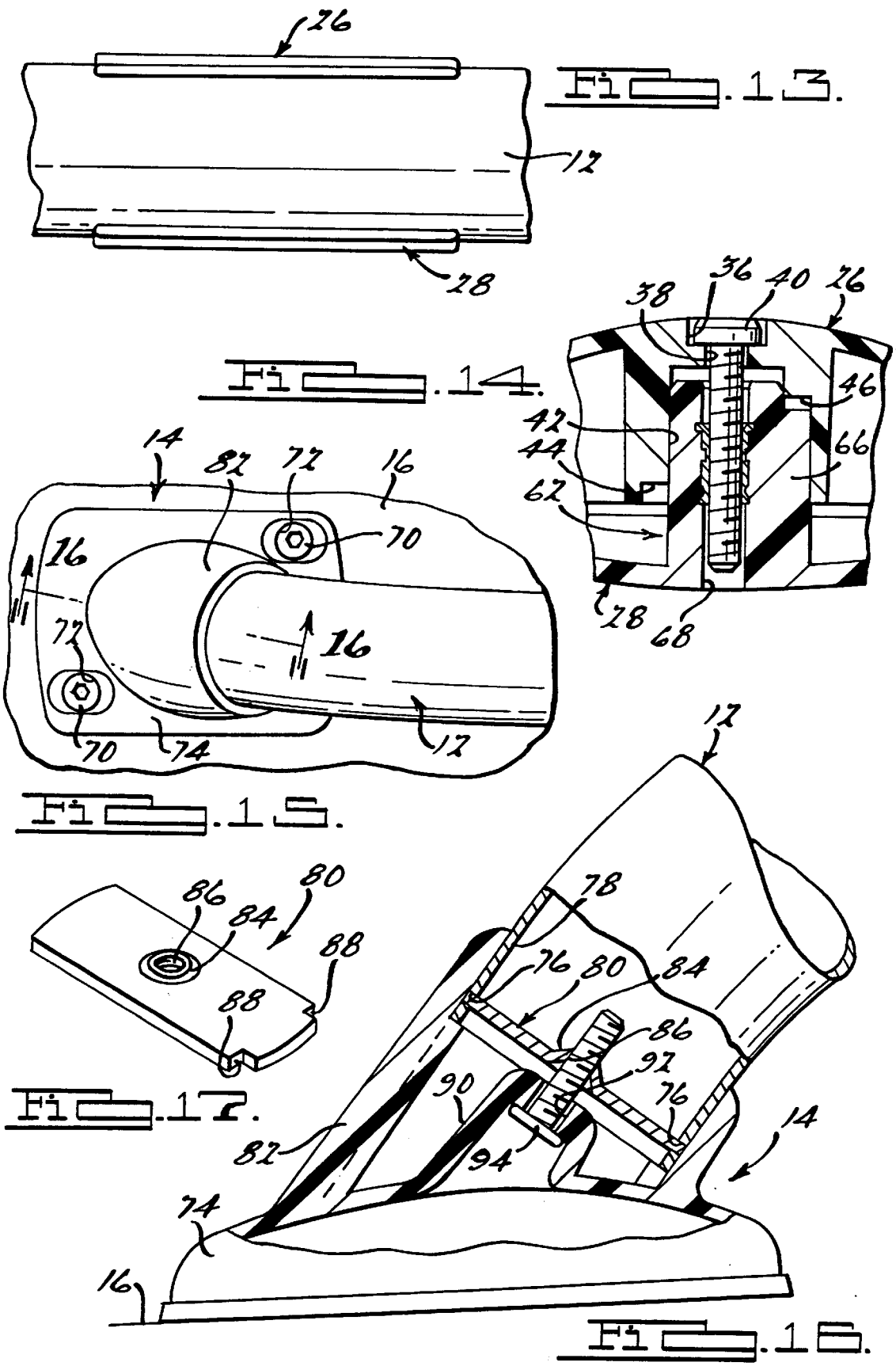

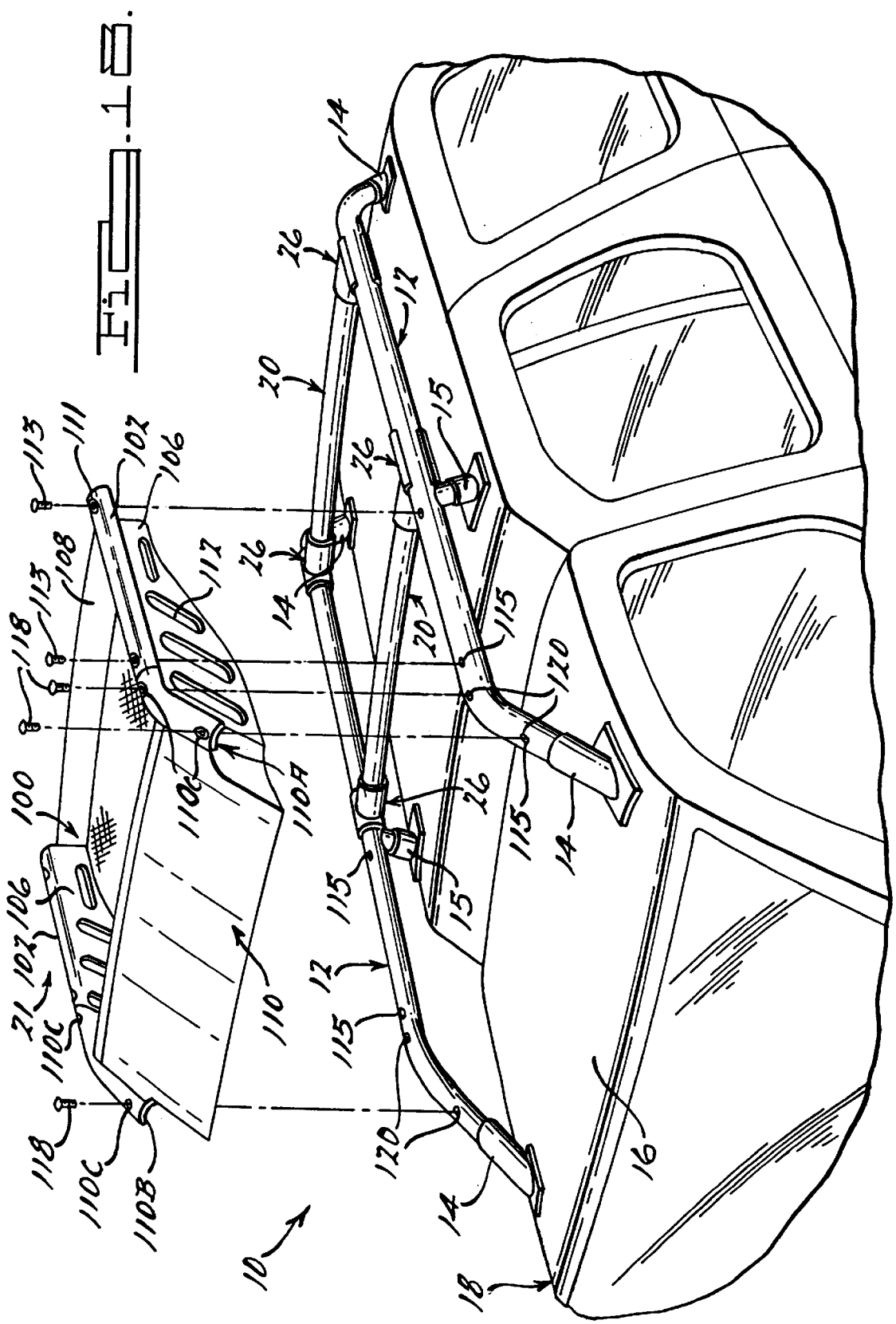

VEHICLE ARTICLE CARRIER HAVING SIDE RAIL MOUNTING SUPPORT WITH CONCEALED SECURING MEMBER

CROSS REFERENCE TO RELATED APPLICATIONS

This application is related to U.S. application Ser. No. 09/328,572, filed concurrently herewith, entitled "Vehicle Article Carrier Having Clamping Cross Bar", attorney docket no. 0210B-000233.

BACKGROUND OF THE INVENTION

1. Technical Field

This invention relates to vehicle article carriers, and more particularly to a vehicle article carrier having a pair of side rails adapted to be secured to an outer body surface of a vehicle, where each end of each side rail is secured via a mounting support member to the outer body surface in a manner such that no fastening elements are visible at the areas where the outermost ends of each side rail are secured to their respective mounting support members.

2. Discussion

Vehicle article carriers are used in a wide variety of applications to support various articles above an outer body surface of the vehicle. Typically, such vehicle article carriers include at least one cross bar, and more typically a pair of cross bars, which are secured to a pair of parallel disposed side rails. The side rails are secured to the outer body surface so as to extend longitudinally along the outer body surface. Typically at least one cross bar is secured between the side rails for supporting variously sized articles thereon.

The outermost ends of each side rail are typically secured via one or more fastening elements to a mounting support which is in turn adapted to be fixedly secured to an outer body surface of the vehicle. The fastening elements are typically threaded fasteners such as threaded screws having a head portion which remains exposed to view after the installation of the side rails and mounting supports are completed.

While such fastening arrangements as described above are functionally adequate to secure the side rails to their respective support members, the visibility of portions of the fasteners nevertheless detracts from the aesthetic appeal of the overall vehicle article carrier.

Accordingly, it is a principal object of the present invention to provide a vehicle article carrier which includes a means for securing a side rail thereof to a mounting support in such fashion that the means for securing is not visible once the side rail is fixedly secured to the mounting support.

It is a further object of the present invention to provide a vehicle article carrier which includes a means for securing a side rail thereof to a mounting support in a manner in which the securing means is not visible once the side rail and mounting support are secured together, and which further does not complicate the assembly process for the vehicle article carrier or require numerous additional component parts to be introduced to accomplish the securing of these two components.

It is still a further object of the present invention to provide a vehicle article carrier which includes a means for securing an end of a side rail thereof to a support member without the securing means being visible after installation of the vehicle article carrier is complete, and which further does not add appreciably to the overall cost of the vehicle article carrier or increase its weight or increase the time required to install same on an outer body surface of a vehicle.

SUMMARY OF THE INVENTION

The present invention relates to a vehicle article carrier having a pair of generally parallel disposed side rails and a plurality of mounting support members for securing outermost opposite ends of each of the side rails fixedly to an outer body surface of a vehicle. A means for securing a tubular outermost end of each side rail to an associated mounting support member is used which is not visible once the outermost end is secured to its associated mounting support member.

In a preferred embodiment the securing means includes a mounting plate which is of dimensions permitting it to be inserted in the tubular outermost end of a side rail and secured therewithin. The mounting support member includes an internal portion and a fastener which engages with the mounting plate to secure it to the internal portion. In this manner neither the fastener nor the mounting plate is visible once the side rail and its mounting support member are secured together.

In the preferred embodiment described above, each outermost end of each side rail includes a pair of opposing slots formed therein. The ends of the mounting plate engage within the slots once the mounting plate is inserted into the outermost end of the side rail. The side rail may then be placed on the mounting support member and the fastener used to engage the mounting plate and to draw it tightly against the internal portion of the mounting support member. The mounting support member can then be secured to the outer body surface via one or more separate fastening elements The above-described arrangement enables the side rail to be secured to a pair of mounting support members at its outermost ends without any fastening components being visible to an individual once the support members are secured to the outer body surface of the vehicle. This concealed means for fastening the side rails to their respective mounting support members further does not complicate the assembly process or require significant added components, or otherwise add significantly to the overall cost of the vehicle article carrier.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a vehicle article carrier in accordance with a preferred embodiment of the present invention mounted on an outer body surface of a vehicle;

FIG. 2 is a front end view of one of the cross bars of the vehicle article carrier shown in FIG. 1;

FIG. 3 is a bottom plan view of the cross bar of FIG. 2 in accordance with directional arrow 3 in FIG. 2;

FIG. 4 is a top plan view of the cross bar of FIG. 2 in accordance with directional line 4 in FIG. 2;

FIG. 13 is an elevational end view of the bracket assembly of FIG. 11 with the movable jaw and fixed jaw clamped to the side rail;

FIG. 14 is a partial cross sectional view taken in accordance with section line 14—14 in FIG. 4 illustrating the key within the keyed recess when the movable jaw is tightened securely to the fixed jaw of the bracket assembly;

FIG. 15 is a plan view of one of the support members used to secure the side rails to the outer body surface of the vehicle, and a portion of one of the side rails secured thereto;

FIG. 16 is a cross sectional side view in accordance with section line 16—16 in FIG. 15 illustrating the concealed coupling mechanism used to secure the side rail to the outer body surface of the vehicle;

FIG. 17 is a perspective view of the coupling plate used to secure one end of a side rail to the mounting member in a concealed fashion; and FIG. 18 is a perspective view of the storage bin shown in FIG. 1 removed from the side rails.

DETAILED DESCRIPTION OF THE PREFERRED EMBODIMENTS

Figure 5:
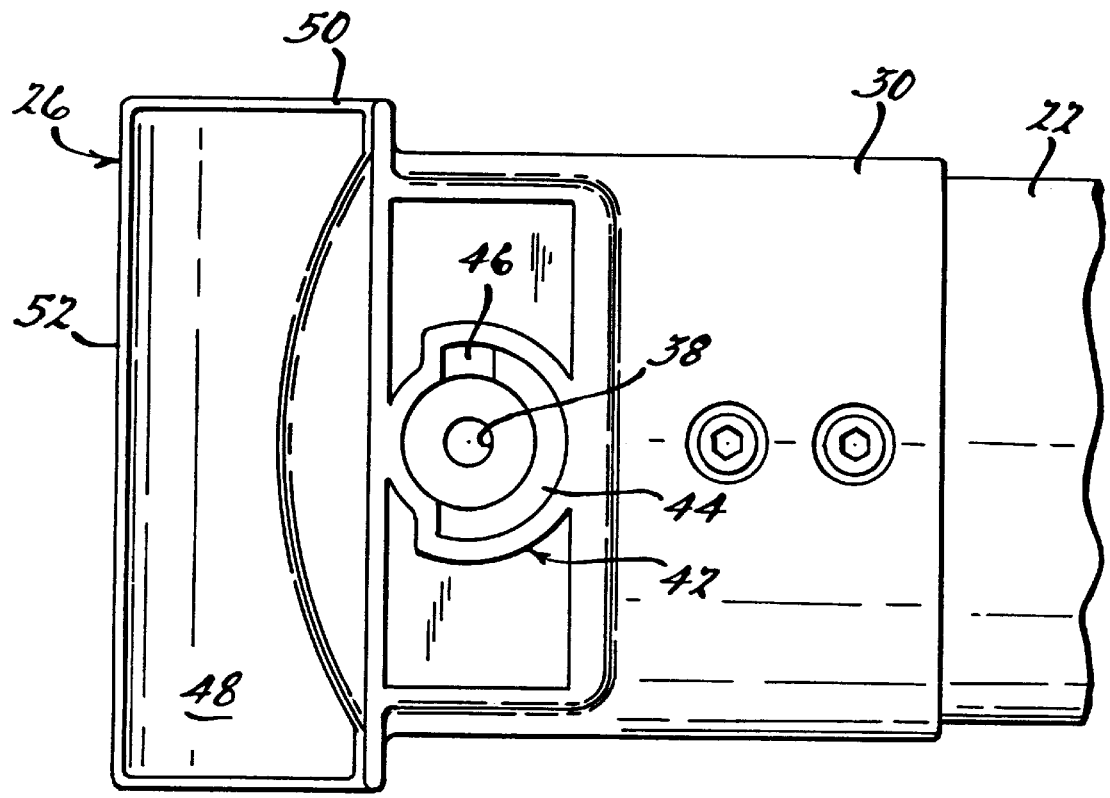
FIG. 5 is a fragmentary view of the cross bar of FIG. 3 with the movable jaw removed from the bracket assembly.

Referring to FIG. 1, there is shown a vehicle article carrier 10 in accordance with a preferred embodiment of the present invention. The vehicle article carrier 10 generally includes a pair of tubular side rails 12 which are secured via support members 14 to an outer body surface 16 of a motor vehicle 18. Center support members 15 (only one being visible in FIG. 1) provide additional support for each side rail 12. While the vehicle article carrier 10 is shown attached to a roof portion of the vehicle 18, it will be appreciated that the vehicle article carrier 10 could just as easily be secured to a rear deck lid of a vehicle or to any other outer body surface suitable for supporting the side rails 12 on the vehicle.

The side rails 12 are disposed generally parallel to one another along the main longitudinal length of the vehicle 18 and include at least one cross bar 20, and more preferably a pair of cross bars 20. In the preferred embodiment, the cross bars 20 are of identical construction and are each movable along the side rails 12 when not clamped tightly to the side rails 12. However, it will be appreciated that one of the cross bars 20 could be fixedly secured so as not to be movable along the side rails 12 if desired. A storage bin 21 is nestably disposed between the side rails 12 at a forward end of the side rails 12.

Referring to FIGS. 2–4, one of the cross bars 20 is shown in greater detail. Referring specifically to FIG. 2, the cross bar 20 includes a tubular central portion 22 having a bracket assembly 24 at each outermost end. Each bracket assembly 24 includes a fixed jaw 26 and a movable jaw 28. The fixed jaw 26 includes a neck portion 30 for receiving an end of the central portion 22 and is secured to the central portion 22 via a pair of threaded screws or other suitable fastening elements 32 extending through apertures 34 formed in the neck portion 30. Thus, the neck portion 30 is fixedly secured to the central portion 22. The elongated configuration of the slots 34 permit a slight degree of adjustment of the neck portion 30 relative to the central portion 22 to accommodate slight variations in the spacing of the side rails 12 when same are assembled to the outer body surface 16 of the vehicle 18 (FIG. 1).

With brief reference to FIG. 4, each neck portion 30 further includes a recess 36 having an opening 38. A threaded fastener 40 extends through the opening 38 and is used to hold the fixed jaw 26 and the movable jaw 28 together, which will be explained in greater detail in the following paragraphs.

Referring now to FIG. 5, each fixed jaw 26 further includes a keyed recess 42. The keyed recess 42 has an internal, partial circumferential shoulder portion 44, the purpose of which will be described momentarily, and a secondary access 46. Opening 38 is formed coaxially in the keyed recess 42 for accepting the fastener 40 (omitted in FIG. 5) therethrough. Optionally, but preferably, a thin rubber pad 48 is secured by a suitable adhesive to an inner surface 50 of a jaw portion 52 of the fixed jaw 26. The fixed jaw 26 is preferably formed from a suitable high strength plastic such as ABS plastic through a conventional injection molding technique.

Figure 6:
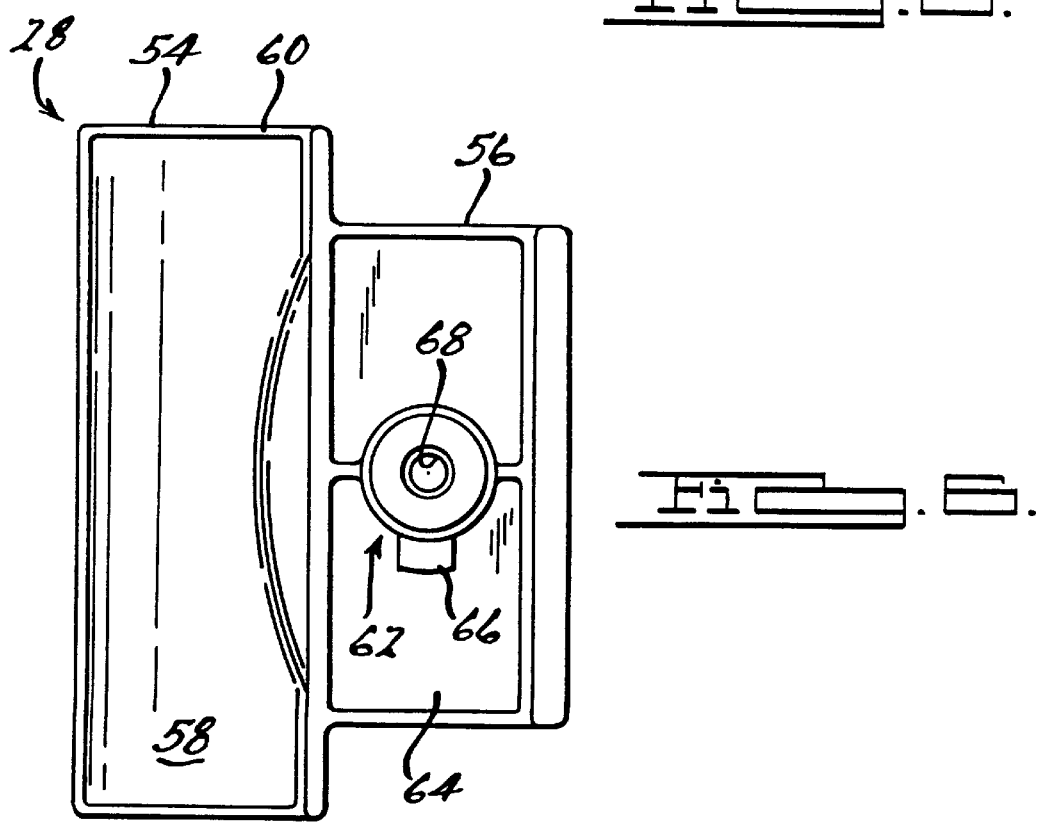
FIG. 6 is a plan view of the inside surface of the movable jaw of FIGS. 2 and 3.

Referring to FIG. 6, the movable jaw 28 is shown. The movable jaw 28 includes a jaw portion 54 and a flange portion 56. The jaw portion 54 likewise preferably includes a thin rubber pad 58 secured to an inner surface 60 thereof via a suitable adhesive. The flange portion 56 includes a key 62 projecting from an inner surface 64 thereof. The key 62 basically is a boss having a rib 66 which acts as a key when the movable jaw 28 is secured to the fixed jaw 26. The key 62 also includes a coaxially disposed aperture 68 which is preferably threaded, or which includes a threaded metal insert, for receiving the fastener 40. The movable jaw 28 is also formed as a single piece component, preferably from ABS plastic, through conventional injection molding techniques.

Referring to FIGS. 7–14, the assembly of one of the bracket assemblies 24 of the cross bar 20 to a portion of one of the side rails 12 will now be described. It will be appreciated that a principal advantage of the present invention is the ability to move the movable jaw 28 out of the way of the side rail 12 such that the fixed jaw 26 can be lowered onto the side rail without interference from the movable jaw 28 when assembling the cross bar 20 to the side rails 12. This eliminates the need for an individual assembling the cross bar 20 to the side rails 12 to manually position the movable jaw 28 at the precise, proper position before tightening the fastener 40. Thus, the construction of the bracket assembly 24 enables the bracket assembly 24 to be clamped to the side rail 12 much more quickly and efficiently than with previously developed bracket assemblies.

Figure 7:
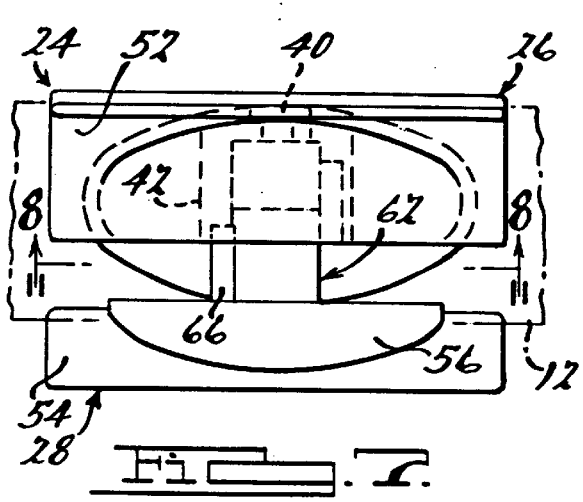
FIG. 7 is an elevational end view of one end of the cross bar of FIG. 1 with the movable jaw in an open position and moved out of the way of the side rail, which is shown in phantom, thereby enabling the cross bar to be lowered onto the side rail without interference from the movable jaw.
Figure 8:
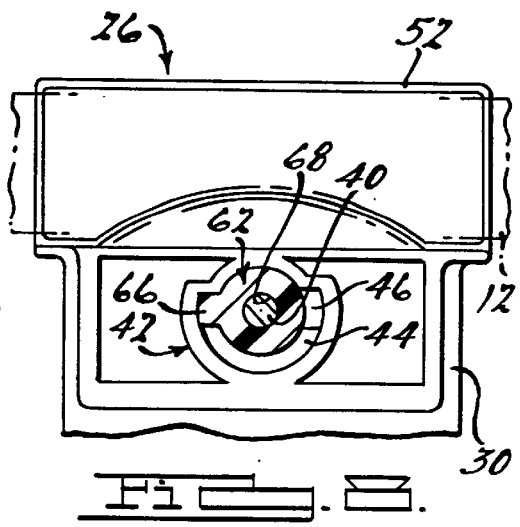
FIG. 8 is a cross sectional view of the key of the movable jaw inserted partially into the keyed recess of the fixed jaw, in accordance with section line 8—8 in FIG. 7.

Referring specifically to FIG. 7, the movable jaw 28 is first secured to the fixed jaw 26 such that the jaw portion 54 is facing away from the side rail 12. This permits the cross bar 20 to be lowered straight down onto the side rails 12 such that the jaw portion 52 of each fixed jaw 26 rests directly on its associated side rail 12. Thus, there is no interference from either movable jaw 28 of the cross bar 20. Referring to FIG. 8, the internal shoulder portion 44 of the keyed recess 42 permits a portion of the key 62 to rest within the keyed recess 42 with the rib 66 resting directly on the shoulder portion 44. The shoulder portion 44 therefore prevents the key 62 from being inserted fully into the keyed recess 42. At this point the fastener 40 is holding the movable jaw 28 against the fixed jaw 26 with a minimal degree of force to prevent the movable jaw from inadvertently moving from the position shown in FIG. 7. Preferably, both movable jaws 28 will be secured in the orientation shown in FIG. 7 before the cross bar is positioned over the side rails 12 for securement thereto.

Figure 9:
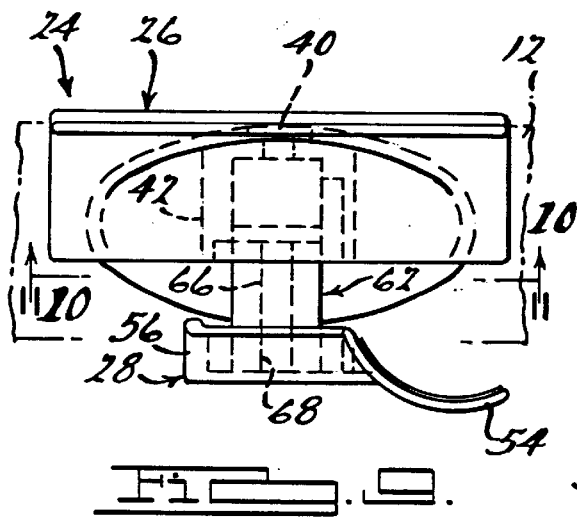
FIG. 9 is an elevational view of the movable jaw after having been rotated 90° from the position shown in FIG. 7 by a 90° turn of the fastener in the tightening direction.
Figure 10:
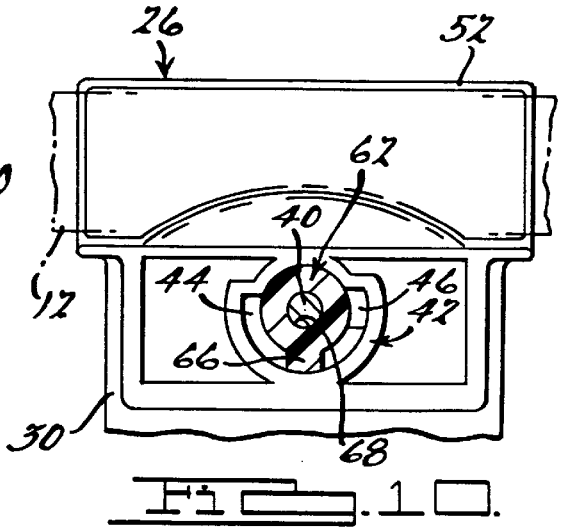
FIG. 10 is a cross sectional view of a portion of the key disposed within the keyed recess taken in accordance with section line 10—10 in FIG. 9.

Referring to FIG. 9, the individual installing the cross bars 20 next further tightens the fastener 40. The friction between the threads of the fastener 40 and the aperture 68, which as described hereinbefore is threaded, causes a corresponding rotation of the movable jaw 28. FIG. 9 illustrates the movable jaw 28 rotated halfway (i.e., 90°) toward the position that is required before it can be drawn into clamping engagement with its associated side rail 12. FIG. 10 illustrates the shoulder portion 44 upon which the rib 66 rides while it is rotated, which prevents the key 62 from being fully inserted within the keyed recess 42.

Figure 11:
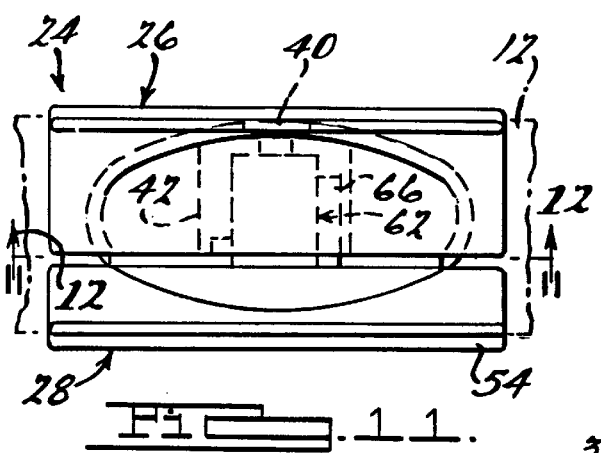
FIG. 11 is an elevational view of the bracket assembly of FIG. 9 with the movable jaw moved 90° from the position shown in FIG. 9 by an additional 90° of movement of the fastener in the tightening direction, and ready to be clamped over the side rail.
Figure 12:
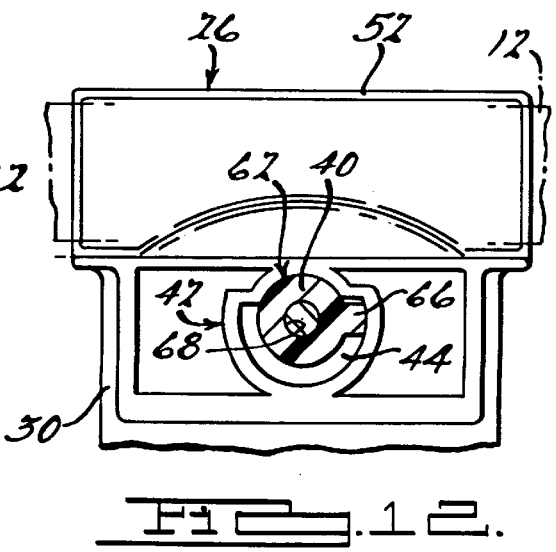
FIG. 12 is a partial cross sectional view illustrating a portion of the key within the keyed recess and taken in accordance with section line 12—12 in FIG. 11.

Referring to FIG. 11, further tightening of the fastener 40 causes continued rotation of the movable jaw 28 into alignment with the fixed upper jaw 26. At this point the movable jaw 28 has been rotated 180° from the position shown in FIG. 7 and is ready to be clamped to the side rail 12. FIG. 12 illustrates that the rib 66 has cleared the shoulder portion 44 of the keyed recess 42 and has dropped into the secondary recess 46, which permits the key 62 to be fully inserted into the keyed recess 42.

Referring now to FIG. 13, the fastening member 40 has been rotated in the tightening direction even further, thus drawing the movable jaw 28 into clamping engagement with the side rail 12. With brief reference to FIG. 14, it can be seen that the key 62 is fully inserted within the keyed recess 42. It will be noted that the rib 66 is slightly shorter than the remainder of the key 62 which enables the key 62 to be partially inserted into the keyed recess 42 even when the rib 66 is not aligned with the secondary recess 46.

The bracket assemblies 24 of the cross bar 20 of the present invention thus provide a means for pre-aligning the movable jaws 28 such that same are held to the fixed jaws 26 in a position so as not to interfere with placement of the fixed jaws 26 directly onto the side rails 12 when assembling the cross bars 20 to the side rails 12. Once positioned on the side rails 12, the individual installing the cross bars 20 simply begins tightening the fasteners 40. The friction between the fasteners 40 and their corresponding movable jaws 28 causes a corresponding rotation of the movable jaws 28 until each becomes precisely aligned with its upper jaw 26 and its associated side rail 12. Continued tightening of each fastener 40 causes each of the movable jaws 28 to be drawn tightly against its associated side rail 12. Therefore, there is no need for the individual to manually align each movable jaw 28 while trying to tighten the fastener 44. The individual simply begins tightening the fastener 40 and the movable jaw is automatically rotated into position and then drawn into clamping engagement with its associated side rail 12 without any manual adjustment being required by the individual performing the installation.

The construction of the bracket assemblies 12 of the cross bar 20 significantly increases the speed and ease with which the cross bars 20 can be secured to the side rails 12. The bracket assemblies 24 also allow the cross bars 20 to be repositioned along the side rails much more quickly than with various other forms of cross bar bracket assemblies presently available. The cross bar 20 further has the advantage of comprising a very limited number of independent parts, which therefore further enhances the ease and speed of assembly of the cross bar 20 to the side rails 12.

Referring now to FIG. 15, one of the support members 14 is shown in greater detail. The support member 14 enables each outermost end of each side rail 12 to be secured thereto without any screws or other fastener elements being visible. The support member 14 is secured to the outer body surface 16 of the vehicle 18 by one or more threaded fastening members 70 which extend through openings 72 in a base portion 74. The fastening members 70 secure to threaded fastening assemblies mounted underneath the outer body surface 16 so that the support member 14 is securely affixed to the outer body surface 16. Once the support member 14 is attached to the outer body surface 16, the fasteners 70 are not visible from the side of the vehicle 18 unless an individual is in a significantly elevated position relative to the vehicle 18. The mounting members 14 preferably comprise single piece components made from high strength plastic, such as ABS plastic, from conventional injection molding techniques.

Referring to FIG. 16, a pair of rectangular opposing slots 76 are cut or otherwise formed at an outermost end portion 78 of each side rail 12. A mounting plate 80 having an overall length approximately equal to the outer diameter of the side rail 12 is inserted into end portion 78 of the side rail 12 prior to inserting the end portion 78 into a neck 82 of the support member 14. The mounting plate 80 preferably comprises a section of metal or other like, strong material having a recessed central portion 84 which includes a threaded aperture 86. The overall width of the mounting plate 80 is preferably just slightly less than the width of the slots 76.

The mounting plate 80 is shown in greater detail in FIG. 17 and includes notched corners 88 for easing the installation of thereof into the interior of the end portion 78 of the side rail 12. The depth of the notched corners 88 corresponds to approximately the thickness of the wall of the side rail 12.

With further reference to FIG. 16, the mounting member 14 further includes a projecting boss portion 90 having a centrally disposed opening 92. A threaded fastening element 94 is disposed through the opening 92 and into the threaded aperture 86 to draw the end portion 78 of the side rail 12 securely against an internal circumferential wall 96 formed inside the neck 82 of the mounting member 14. In this manner the side rail 12 is secured to the mounting member 14 without any screws or other like fasteners being visible from the side of the vehicle 18.

Referring now to FIG. 18, the storage bin 21 is shown in greater detail. The storage bin 21 is preferably formed as a two piece component from high strength plastic, such as ABS plastic. The storage bin 21 includes a bin portion 100 and an independent air dam 110. The bin portion 100 has a width just slightly less than the distance separating the side rails 12, and a pair of semi-circular arms 102 that have a radius of curvature slightly greater than the radius of curvature of the outside diameter of each of the side rails 12. In this manner the arms 102 can rest on portions of the side rails 12 while accommodating a degree of variability in the spacing of the side rails 12. Each of the arms 102 further has at least one slot-like opening, and more preferably a pair of slot-like openings 111 adapted to receive a corresponding plurality of external threaded fasteners 113. The fasteners 113 may be of the type that has a knob or handle portion such that a user can disengage it merely by grasping the knob or handle portion with a hand and turning, such that no external tools are needed to release the storage bin 21. The fasteners 113 are secured to threaded openings 115 in the side rails 12 and enable the entire storage bin 21 to be quickly removed if needed. The slot-like configuration of the openings 111 also helps to accommodate a slight degree of variability in the spacing of the side rails 12.

The storage bin 21 further includes a bottom wall 104 which is integrally formed with a pair of side walls 106 and with a rear wall 108. The front air dam 110 also includes a pair of semi-circular arms 110a and 110b which each have a radius of curvature preferably about equal to the semi-circular arms 102 of the bin portion 100. The semi-circular arms 110a and 110b further include one or more slot-like openings 110c which accommodate a slight degree of variability in the spacing of the side rails 12. The air dam 110 is secured preferably by threaded fasteners 118 to threaded openings 120 in a forward portion of each side rail 12. At least the side walls 106 and bottom wall 104 are formed with a plurality of openings 112 to allow air to pass therethrough and to enable water to drain out of the bin 21. The rear wall 108 may also include a plurality of openings if desired. The storage bin 21 thus forms a lightweight yet structurally strong component which can be easily removed from the side rails 12 if needed. The quick and convenient removability of the bin 21 permits a sunroof to be incorporated and used when the user removes the bin 21.

The storage bin 21 is ideally suited for transporting a wide variety of smaller items which are not as easily transported directly on the cross bars 20 or side rails 12. Such items may include, but are not limited to, wet suits used in diving or water-skiing activities or other items which may be wet after use. With such equipment, the openings 112 enable water to exit the storage bin 21 as well as to allow air to pass through the side walls 106. Other forms of sporting, camping or recreational equipment can also be carried easily within the storage bin 21. If desired, an external net could be secured over the storage bin 21 in connection with one or more conventional adjustable and/or elastic hold down straps.

It is an important advantage of the storage bin 21 that the width of the bin portion 100 is slightly less than the distance between the side rails 12. This enables the storage bin 21 to be nestably disposed between the side rails 12 and suspended by the arms 102. This configuration, together with the front air dam 110, provides the storage bin 21 with an extremely low, aesthetically appealing and aerodynamically efficient profile. This is in contrast to other forms of storage implements which are typically secured to the cross bars of an article carrier, and which therefore present a significantly protruding, aerodynamically inefficient, and often unaesthetically appealing profile.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus adapted to be fixedly secured to an outer body surface of a vehicle, said apparatus comprising:

a pair of side rails adapted to be fixedly secured to said outer body surface generally parallel to one another along a major longitudinal length of said vehicle;

at least one mounting member adapted to receive an outermost end portion of one of said side rails and to be fixedly secured to said outer body surface;

an independent mounting plate within an interior of said outermost end of said one side rail such that an outermost edge of said mounting plate is engaged with at least a portion near a distal edge of said outermost end, so as to be retained within said outermost end without the need for an independent fastening element;

a fastener for engaging within an interior portion of said mounting member and with said mounting plate to secure said outermost end of said one side rail to said mounting member without said fastener or said mounting plate being visible once said one side rail is secured to said mounting member.

2. The apparatus of claim 1, wherein said outermost end of said one side rail comprises a pair of opposing slots formed therein; and wherein said mounting plate is adapted to engage within said opposing slots when inserted into said outermost end and to be retained therein during assembly of said one side rail to said mounting member.

3. The apparatus of claim 1, wherein said interior portion of said mounting member comprises an internal boss portion having an opening; and wherein said mounting plate includes a threaded opening formed to align with said opening in said boss portion when said one side rail is being secured to said mounting member; and wherein said fastener comprises a threaded fastener for securing said mounting plate to said boss portion.

4. The apparatus of claim 1, wherein said mounting plate has an overall length approximately equal to an outer dimension of said one side rail.

5. The apparatus of claim 1, wherein said outermost end portion includes a pair of opposing slots formed therein;

wherein said mounting plate is adapted to engage with said slots to be retained within said interior area of said outermost end of said one side rail;

wherein said mounting member includes an internal boss; and wherein said fastener secures said mounting plate, and therefore said outermost end of said one side rail, to said boss such that no fastening elements are visible to an individual once said one side rail is secured to said mounting member.

6. The apparatus of claim 5, wherein said mounting plate includes a plurality of notches at one end thereof for easing insertion thereof into said interior of said outermost end of said one side rail.

7. A vehicle article carrier apparatus adapted to be fixedly secured to an outer body surface of a vehicle, said apparatus comprising:

a pair of side rails adapted to be fixedly secured to said outer body surface generally parallel to one another along a major longitudinal length of said vehicle;

at least one mounting support member adapted to receive an outermost end portion of one of said side rails and to be fixedly secured to said outer body surface, said support member having an internal portion;

said outermost end having at least one slot formed therein;

a mounting plate disposed within said outermost end so that its outermost edge engages with said slot in a manner such that said mounting plate is retained to said outermost end of said side rail; and a fastener for engaging with said internal portion of said support member and with said mounting plate to secure said mounting plate to said internal portion, and thereby said outermost end of said one side rail to said support member, without said fastener and said mounting plate being visible once said one side rail is secured to said support member.

8. The apparatus of claim 7, wherein said outermost end of said one side rail includes a pair of opposing slots formed therein; and wherein opposite ends of said mounting plate engage within said slots such that said mounting plate is retained within said slots.

9. The apparatus of claim 7, wherein said internal portion of said mounting support member comprises an internal boss portion having an opening therein; and wherein said mounting plate includes a threaded aperture; and wherein said fastener extends through said opening in said boss portion and engages with said threaded aperture to secure said mounting plate, and therefore said one side rail, to said mounting support member.

10. The apparatus of claim 7, wherein said mounting support member comprises a neck portion and a base portion, said internal portion being disposed within said neck portion; and said neck portion being operable to receive said outermost end of said one side rail therein.

11. The apparatus of claim 7, wherein said mounting plate comprises a metal plate having notches formed at one end thereof to ease insertion into one of said slots formed in said outermost end of said one side rail.

12. A vehicle article carrier apparatus adapted to be fixedly secured to an outer body surface of a vehicle, said apparatus comprising:

a pair of side rails adapted to be fixedly secured to said outer body surface generally parallel to one another along a major longitudinal length of said vehicle;

at least one mounting support member adapted to receive an outermost end portion of one of said side rails and to be fixedly secured to said outer body surface, said support member having a base portion and a neck portion, said base portion adapted to be fixedly secured to said outer body surface and said neck portion being operable to receive said outermost end portion of said one side rail;

said neck portion of said mounting support member further including an internally formed boss portion having an opening;

said outermost end of said one side rail having at least one slot formed therein;

a mounting plate disposed within said outermost end so that its outermost edge engages with said slot in a manner such that said mounting plate is retained to said outermost end of said side rail; and a fastener for engaging with said internal boss portion of said support member and with said mounting plate to secure said mounting plate to said internal boss portion, and thereby said outermost end of said one side rail to said support member, without said fastener and said mounting plate being visible once said one side rail is secured to said support member.

13. A method for securing a tubular side rail of a vehicle article carrier to a support member, wherein the support member is adapted to be fixedly secured to an outer body surface of a vehicle, and where the side rail and support member are secured together without any fastening component being visible once the support member and side rail are secured together, the method comprising the steps of;

forming at least one slot in an outermost end portion of said side rail;

inserting a mounting plate within said outermost end portion of said side rail and engaging said slot with said mounting plate;

placing said mounting plate against an internal portion of the support member; and using a fastening element to secure said mounting plate, and therefore said outermost end portion of said side rail, to said internal portion of said support member such that said fastening element and said mounting plate are not visible once said side rail and said support member are secured together.

* * * * *